(12) United States Patent
Ha et al.

(10) Patent No.: US 12,334,501 B2
(45) Date of Patent: Jun. 17, 2025

(54) ELECTROLYTE FOR LITHIUM-SULFUR BATTERY AND LITHIUM-SULFUR BATTERY COMPRISING SAME

(71) Applicant: LG ENERGY SOLUTION, LTD., Seoul (KR)

(72) Inventors: Yeyoung Ha, Daejeon (KR); Jaegil Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/116,931

(22) Filed: Mar. 3, 2023

(65) Prior Publication Data

US 2023/0207881 A1    Jun. 29, 2023

Related U.S. Application Data

(63) Continuation of application No. 17/053,821, filed as application No. PCT/KR2019/015733 on Nov. 18, 2019, now Pat. No. 11,631,896.

(30) Foreign Application Priority Data

Nov. 23, 2018  (KR) .................. 10-2018-0145896
Apr. 4, 2019   (KR) .................. 10-2019-0039756
Nov. 13, 2019  (KR) .................. 10-2019-0144814

(51) Int. Cl.
*H01M 10/0568*   (2010.01)
*H01M 4/38*      (2006.01)
(Continued)

(52) U.S. Cl.
CPC ....... *H01M 10/0568* (2013.01); *H01M 4/382* (2013.01); *H01M 10/052* (2013.01);
(Continued)

(58) Field of Classification Search
CPC ......... H01M 10/0567; H01M 10/0569; H01M 10/0568; H01M 4/382; H01M 10/052; H01M 10/44; H01M 2300/0037
See application file for complete search history.

(56) References Cited

U.S. PATENT DOCUMENTS

2002/0045102 A1    4/2002  Jung et al.
2003/0073005 A1    4/2003  Kim et al.
(Continued)

FOREIGN PATENT DOCUMENTS

CN    1336696 A    2/2002
CN    1412882 A    4/2003
(Continued)

OTHER PUBLICATIONS

Chao et al., "Solid-State Microelectrochemistry: Electrical Characteristics of a Solid-State Microelectrochemical Transistor Based on Poly(3-methylthiophene)", Journal of the American Chemical Society, vol. 109, No. 7, 1987, pp. 2197-2199.
(Continued)

*Primary Examiner* — Laura Weiner
(74) *Attorney, Agent, or Firm* — Birch, Stewart, Kolasch & Birch, LLP

(57) ABSTRACT

Discussed is an electrolyte solution for a lithium-sulfur battery including a lithium salt, an organic solvent and an additive, and a lithium-sulfur battery including the same, wherein the additive includes a heterocyclic compound containing at least one double bond, and a heterocycle of the heterocyclic compound comprises an oxygen atom or a sulfur atom.

4 Claims, 2 Drawing Sheets

(51) Int. Cl.
  *H01M 10/052* (2010.01)
  *H01M 10/0567* (2010.01)
  *H01M 10/44* (2006.01)
  *H01M 10/0569* (2010.01)
  *H01M 10/42* (2006.01)

(52) U.S. Cl.
  CPC ....... *H01M 10/0567* (2013.01); *H01M 10/44* (2013.01); *H01M 10/0569* (2013.01); *H01M 10/4235* (2013.01); *H01M 2300/0037* (2013.01)

(56) References Cited

U.S. PATENT DOCUMENTS

| | | |
|---|---|---|
| 2004/0185347 A1 | 9/2004 | Kim et al. |
| 2005/0175904 A1 | 8/2005 | Gorkovenko |
| 2006/0199080 A1 | 9/2006 | Amine et al. |
| 2007/0212615 A1 | 9/2007 | Jost et al. |
| 2016/0322665 A1 | 11/2016 | Kim et al. |
| 2016/0336625 A1 | 11/2016 | Jeong et al. |
| 2017/0301962 A1 | 10/2017 | Park et al. |
| 2018/0294476 A1 | 10/2018 | Zhamu et al. |

FOREIGN PATENT DOCUMENTS

| | | |
|---|---|---|
| CN | 1531134 A | 9/2004 |
| CN | 104051786 A | 9/2014 |
| CN | 106716702 A | 5/2017 |
| CN | 107946644 A | 4/2018 |
| CN | 108281659 A | 7/2018 |
| JP | 2002-75446 A | 3/2002 |
| JP | 2008-532248 A | 8/2008 |
| JP | 2016-219411 A | 12/2016 |
| KR | 10-2003-0031396 A | 4/2003 |
| KR | 10-0578797 B1 | 5/2006 |
| KR | 10-2006-0135958 A | 12/2006 |
| KR | 10-2007-0027512 A | 3/2007 |
| KR | 10-2008-0067964 A | 7/2008 |
| KR | 10-2015-0072239 A | 6/2015 |
| KR | 10-2016-0128014 A | 11/2016 |
| KR | 10-2018-0114631 A | 10/2018 |

OTHER PUBLICATIONS

International Search Report issued in PCT/KR2019/015733 (PCT/ISA/210), dated Feb. 26, 2020.

Yang et al., "Pyrrole as a promising electrolyte additive to trap polysulfides for lithium-sulfur batteries", Journal of Power Sources, vol. 348, 2017, pp. 175-182.

[Figure 1]
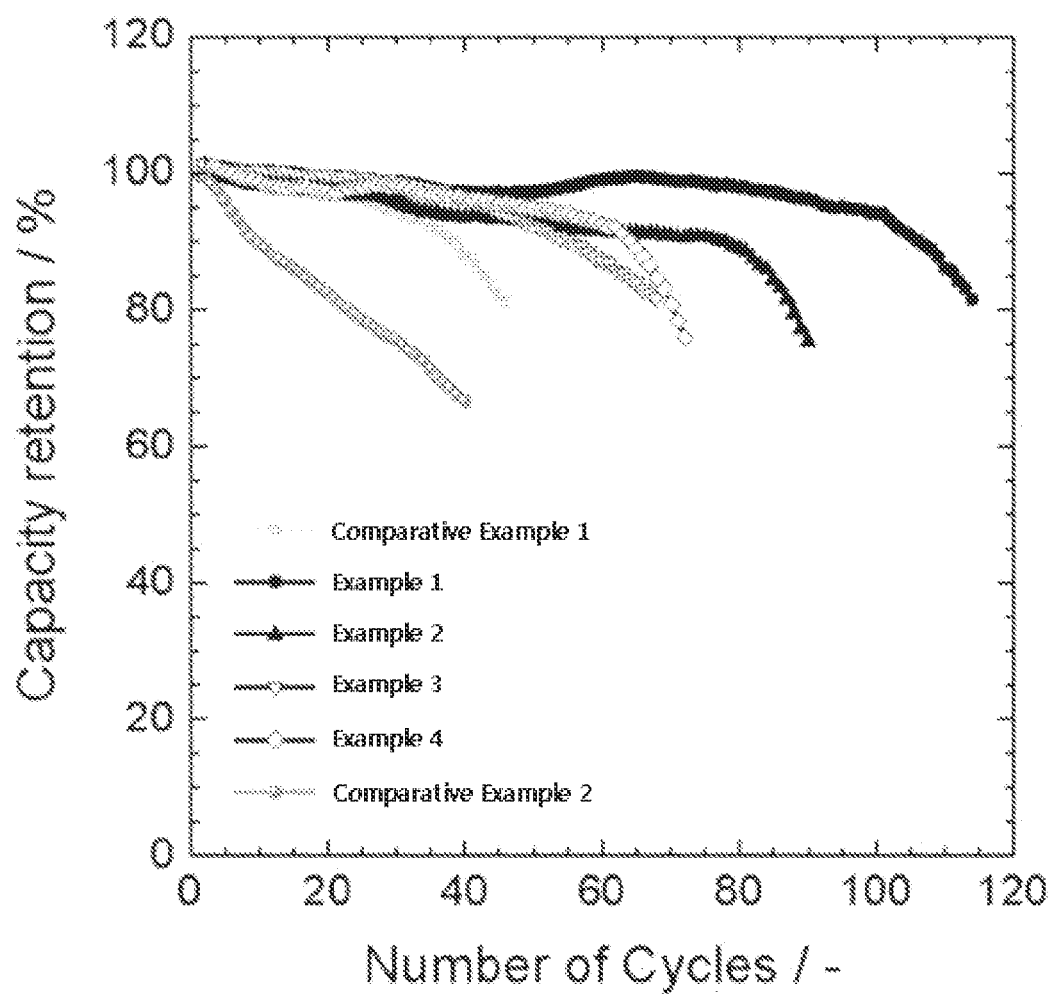

[Figure 2]
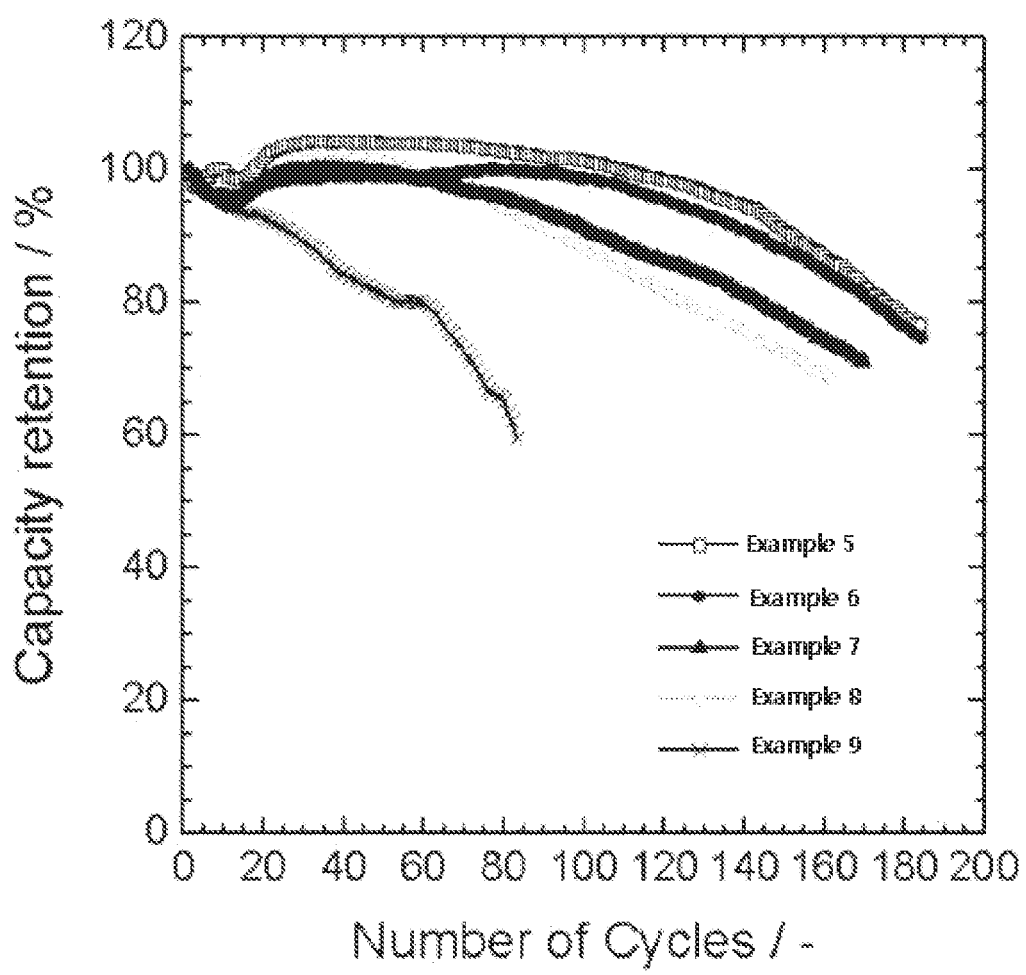

ELECTROLYTE FOR LITHIUM-SULFUR BATTERY AND LITHIUM-SULFUR BATTERY COMPRISING SAME

CROSS-REFERENCE TO RELATED APPLICATIONS

This application is a Continuation of U.S. application Ser. No. 17/053,821, filed on Nov. 9, 2020 (now U.S. Pat. No. 11,631,896), which is the U.S. National Phase of PCT/KR2019/015733, filed on Nov. 18, 2019, which claims the benefits under 35 U.S.C. § 119 (a) to Korean Patent Application No. 10-2018-0145896, filed in Korea on Nov. 23, 2018, Korean Patent Application No. 10-2019-0039756, filed in Korea on Apr. 4, 2019, and Korean Patent Application No. 10-2019-0144814, filed in Korea on Nov. 13, 2019, all of which are hereby expressly incorporated by reference into the present application.

TECHNICAL FIELD

The present invention relates to an electrolyte solution for a lithium-sulfur battery and a lithium-sulfur battery comprising the same.

BACKGROUND ART

As an alternative to continuing environmental issues, there is a growing interest and demand for large capacity energy storage technologies such as electric vehicles. In order to implement such a large capacity energy storage device, it is indispensable to develop a secondary battery technology with high energy density. The lithium secondary batteries that currently have the highest technical level are composed of lithium-containing transition metal oxide and graphite, respectively, as a positive electrode and negative electrode material of the battery, and are used as energy sources for portable or small electronic devices based on their excellent energy storage and lifetime characteristics. However, despite the technical and commercial success of these lithium secondary batteries, currently, the energy density of these lithium secondary batteries is exorbitantly insufficient to be applied as a large battery for a large capacity energy storage device. Accordingly, it is important to develop an electrode material or battery technology capable of expressing higher energy density. Therefore, a lithium metal battery using lithium metal as a negative electrode, such as a lithium-air or lithium-sulfur battery, has been proposed as a solution for a large capacity battery.

Since the lithium metal has the lowest electrochemical reduction potential and is the lightest metal element, it is a negative electrode material for an ideal lithium secondary battery with high energy density. In addition, as compared to the conventional graphite material which is operated by the intercalation/deintercalation reaction of lithium ions, lithium metal also has good output characteristics because lithium metal stores/converts energy through a simple dissolution/deposition process of lithium. However, the lithium metal has problems of low coulombic efficiency and lifetime due to the reactivity with organic electrolyte in the battery. In particular, the lithium metal is limited in its use, due to the deterioration of the performance of the negative electrode according to dendrites and dead lithium formed during the charging/discharging process and decomposition of electrolyte solution that occurs continuously on the surface of highly reactive lithium metal by the progress of non-uniform intercalation/deintercalation of lithium metal.

As a measure to overcome these problems of the lithium metal, the introduction of a stable protective film is considered as a key technology. If a stable protective film is formed on the surface of lithium, it is possible to control the continuous reaction of lithium metal and the electrolyte, and to control the shape of the lithium metal during charging and thus ensure the stability of the battery. As a kind of such a protective film, there is a physical protective film and a chemical protective film, and the process method can be divided into a method of forming by processing before assembly of the battery and a method of forming during operation after assembly of the battery. Currently, most protective film technologies are technologies related to physical protective films in the form of transferring materials such as nanostructures or organic/inorganic composites onto the surface of lithium through a pretreatment process using carbon or metal having excellent mechanical properties. However, in the case of a physical protective film, there is a disadvantage in that a nanostructure and a complicated process in the transfer process are required, and it is disadvantageous in terms of price competitiveness. On the other hand, in the case of relatively simple and economical chemical protective film, it is possible to form a solid-electrolyte-interface (SEI) protective film during the operation of the battery through the introduction of additives into the electrolyte or to protect the surface of lithium by the principle of controlling the chemical reactivity of electrolyte. However, despite the simple process, it is not easy to find an additive material capable of forming a stable protective film in a form that conducts lithium ions through chemical or electrochemical reactions with lithium but cannot conduct electrons, and the lithium stabilization effect of the chemical protective film developed to date is also not excellent.

PRIOR ART DOCUMENT

Patent Document

Korean Patent Application Publication No. 10-2016-0128014

DISCLOSURE

Technical Problem

As described above, in a lithium-sulfur battery using a lithium-based metal as a negative electrode, lithium dendrites are formed on the surface of the negative electrode, and decomposition of the electrolyte solution occurs continuously, thereby degrading the performance of the lithium-sulfur battery. Accordingly, the inventors of the present invention have conducted various studies on forming a protective layer on a lithium electrode in a novel manner. As a result, the inventors of the present invention have found out that the above problems can be solved through the use of an electrolyte solution which contains a heterocyclic compound containing at least one double bond and a heteroatom of oxygen or sulfur as an additive, thereby completing the present invention.

Therefore, it is an object of the present invention to provide an electrolyte solution for a lithium-sulfur battery.

In addition, it is another object of the present invention to provide a lithium-sulfur battery comprising the electrolyte solution.

Technical Solution

In order to achieve the above objects, the present invention provides an electrolyte solution for a lithium-sulfur battery comprising a lithium salt, an organic solvent and an additive, wherein the additive comprises a heterocyclic compound containing at least one double bond, and the heterocycle comprises an oxygen atom or a sulfur atom.

The present invention also provides a lithium-sulfur battery comprising a positive electrode; a negative electrode; a separator interposed between the positive electrode and the negative electrode; and an electrolyte solution, wherein the negative electrode is a lithium-based metal, and the electrolyte solution is the electrolyte solution of the present invention.

Advantageous Effects

The electrolyte solution for the lithium-sulfur battery of the present invention can form a protective film on the surface of the negative electrode which is a lithium-based metal, thereby not requiring a separate protective film, increasing the reaction uniformity of lithium metal, inhibiting the formation of lithium dendrite, and reducing the decomposition and side reactions of the electrolyte solution on the surface of the lithium-based metal. Accordingly, the lithium-sulfur battery comprising the electrolyte solution of the present invention may have an effect of improving lifetime characteristics.

DESCRIPTION OF DRAWINGS

FIG. 1 is a graph measuring lifetime characteristics of the lithium-sulfur batteries of Examples 1 to 4 and Comparative Examples 1 to 2.

FIG. 2 is a graph measuring lifetime characteristics of the lithium-sulfur batteries of Examples 5 to 9.

[Best Mode]

Hereinafter, the present invention will be described in more detail.

A major cause of premature degeneration of a lithium secondary battery is the degradation of the efficiency of a lithium-based negative electrode. If a lithium-based metal is used as a negative electrode, not only the reaction is not uniform due to the non-uniform oxide layer (native oxide layer), but also dead lithium is easily generated due to the growth of dendrites during charging (Li plating), and lithium which can participate in the reaction is consumed, thereby reducing the efficiency of the lithium-based negative electrode.

In order to secure uniform reactivity of the surface of the lithium-based metal and to inhibit the growth of lithium dendrites, a method of forming a protective film, a conductive host matrix, and the like on the lithium-based metal layer has been attempted. In the case of the protective film, high mechanical strength for suppressing lithium dendrites and high ion conductivity for delivering lithium ions are required at the same time, but the mechanical strength and ion conductivity are in a trade-off relationship with each other, and thus it is difficult to simultaneously improve the mechanical strength and the ion conductivity.

In the present invention, it was intended to provide an electrolyte solution for a lithium-sulfur battery, which can increase the reaction uniformity of the lithium-based metal, inhibit the generation of lithium dendrites, and improve the lifetime characteristics of the battery, by using an electrolyte solution for a lithium-sulfur battery, which contains an additive, and thus forming a polymer protective film on the surface of the lithium-based metal due to the ring-opening polymerization reaction of the additive contained in the electrolyte solution in the initial discharging stage, without forming a separate protective film on the surface of the lithium-based metal which is a negative electrode.

Electrolyte Solution for Lithium-Sulfur Battery

The present invention relates to an electrolyte solution for a lithium-sulfur battery comprising a lithium salt, an organic solvent, and an additive, wherein the additive comprises a heterocyclic compound containing at least one double bond, and a heterocycle of the heterocyclic compound comprises an oxygen atom or a sulfur atom.

The additive is a heterocyclic compound containing one or more double bonds, wherein the heterocycle contains an oxygen atom or a sulfur atom. Due to the inclusion of the oxygen atom or sulfur atom, a polymer protective film that can inhibit the generation of lithium dendrites and reduce the decomposition and side reactions of electrolyte solution on the surface of the lithium-based metal can be formed on the surface of the lithium-based metal which is a negative electrode, thereby exhibiting excellent lifetime characteristics.

The heterocyclic compound may be a 3 to 15-membered, preferably 3 to 7-membered, more preferably 5 or 6-membered heterocyclic compound.

In addition, the heterocyclic compound may be a heterocyclic compound substituted or unsubstituted with at least one selected from the group consisting of an alkyl group having 1 to 4 carbon atoms, a cyclic alkyl group having 3 to 8 carbon atoms, an aryl group having 6 to 10 carbon atoms, a halogen group, a nitro group ($-NO_2$), an amino group ($-NH_2$), and a sulfonyl group ($-SO_2$); or a polycyclic compound of at least one selected from the group consisting of a cyclic alkyl group having 3 to 8 carbon atoms and an aryl group having 6 to 10 carbon atoms, and a heterocyclic compound.

If the heterocyclic compound is a heterocyclic compound substituted with an alkyl group having 1 to 4 carbon atoms, it is preferable because the radical is stabilized to suppress side reactions between the additive and the electrolyte solution. In addition, if the heterocyclic compound is a heterocyclic compound substituted with a halogen group or a nitro group, it is preferable because a functional protective film can be formed on the surface of the lithium-based metal. The functional protective film is a stable and compact protective film, which allows the uniform deposition of the lithium-based metal and can suppress the side reaction between the polysulfide and the lithium-based metal.

Specifically, the heterocyclic compound may comprise, for example, at least one selected from the group consisting of furan, 2-methylfuran, 3-methylfuran, 2-ethylfuran, 2-propylfuran, 2-butylfuran, 2,3-dimethylfuran, 2,4-dimethylfuran, 2,5-dimethylfuran, pyran, 2-methylpyran, 3-methylpyran, 4-methylpyran, benzofuran, 2-(2-nitrovinyl) furan, thiophene, 2-methylthiophene, 2-ethylthiophene, 2-propylthiophene, 2-butylthiophene, 2,3-dimethylthiophene, 2,4-dimethylthiophene and 2,5-dimethylthiophene, preferably, at least one selected from the group consisting of 2-methylfuran and 2-methylthiophene.

In a lithium-sulfur battery using a lithium-based metal as a negative electrode, if an electrolyte solution for a lithium-sulfur battery containing the heterocyclic compound of the present invention described above is used as an additive, a protective film (solid electrolyte interface, SEI layer) can be formed on the surface of the lithium-based metal by the ring-opening polymerization reaction of the heterocyclic compound in the initial discharging stage, thereby inhibiting the generation of lithium dendrites, and furthermore, the degradation and subsequent side reactions of the electrolyte solution on the surface of the lithium-based metal can be reduced, thereby improving lifetime characteristics of the lithium-sulfur battery. Therefore, the heterocyclic compound of the present invention requires at least one double bond in order to form a polymer protective film, and contains oxygen or sulfur as heteroatoms to exhibit polarity, thereby increasing the affinity with the organic solvent of the electrolyte solution and thus facilitating the utilization as an additive for the electrolyte solution and forming a polymer protective film having the above effect.

However, in the case of containing nitrogen as the hetero atom, the resistance of the cell is increased, which is not preferable because the lifetime of the lithium-sulfur battery is reduced.

The heterocyclic compound may be contained in an amount of 0.1 to 100 parts by volume, preferably 25 to less than 100 parts by volume, and more preferably 25 to 66.7 parts by volume, relative to 100 parts by volume of the organic solvent.

If the heterocyclic compound is contained in less than 0.1 parts by volume, the formation of the protective film on the surface of the lithium-based metal is not complete. If the heterocyclic compound exceeds 100 parts by volume, there may be a problem that the lifetime of the battery is decreased due to the increase in the surface resistance of the electrolyte solution and the lithium-based metal.

If the amount of the heterocyclic compound is converted to % by weight, the heterocyclic compound may be contained in an amount of 0.1 to 50% by weight, preferably 15 to 38% by weight, most preferably 15 to 30% by weight relative to the total weight of the electrolyte solution for the lithium-sulfur battery of the present invention.

The heterocyclic compound may exhibit properties that make it difficult to dissolve the salt due to delocalization of lone pair electrons of the heteroatom, thereby reducing the ability to solvate the polysulfide and thus reducing the leaching amount of the polysulfide into the electrolyte solution. Accordingly, the increase in the resistance of the electrolyte solution for the lithium-sulfur battery can be suppressed, thereby further improving the lifetime characteristics of the lithium-sulfur battery. The reduction of the leaching amount of the polysulfide may occur when the heterocyclic compound is contained in an amount of 25 to less than 100 parts by volume, most preferably 25 to 66.7 parts by volume, relative to 100 parts by volume of the organic solvent. Therefore, in order to further improve the lifetime characteristics of the lithium-sulfur battery, it is preferable to use a heterocyclic compound within the above content range.

The electrolyte solution for the lithium-sulfur battery of the present invention further comprises a lithium salt as an electrolyte salt to increase ion conductivity. The lithium salt is not particularly limited in the present invention and may be used without limitation as long as it is commonly used in the art. For example, the lithium salt may comprise at least one selected from the group consisting of LiCl, LiBr, LiI, $LiClO_4$, $LiBE_4$, $LiB_{10}Cl_{10}$, $LiPF_6$, $LiCF_3SO_3$, $LiCF_3CO_2$, $LiC_4BO_8$, $LiAsF_6$, $LiSbF_6$, $LiAlCl_4$, $CH_3SO_3Li$, $CF\ SO_3Li$, $(CF_3SO_2)\ 2NLi$, $(C_2F_5SO_2)_2NLi$, $(SO_2F)\ 2NLi$, $(CF_3SO_2)\ 3CLi$, lithium chloroborane, lithium lower aliphatic carboxylate (for instance, lithium lower aliphatic carboxylate having 4 or less carbon atoms), lithium tetraphenyl borate and lithium imide, Preferably, the lithium salt may be $(SO_2F)_2NLi$ (lithium bis(fluorosulfonyl)imide, LiFSI).

The concentration of the lithium salt may be appropriately determined in consideration of ion conductivity and the like, and may be, for example, 0.1 to 4.0 M, preferably 0.5 to 2.0 M. If the concentration of the lithium salt is less than the above range, it is difficult to ensure ion conductivity suitable for operating the battery. On the contrary, if the concentration exceeds the above range, the viscosity of the electrolyte solution is increased to lower the mobility of the lithium ion and the decomposition reaction of the lithium salt itself may increase to deteriorate the performance of the battery. Therefore, the concentration is adjusted appropriately within the above range.

The electrolyte for the lithium metal battery of the present invention comprises an organic solvent, and those commonly used in the electrolyte for the lithium secondary battery can be used without limitation. For example, as the organic solvent, ether, ester, amide, linear carbonate, cyclic carbonate, etc. may be used alone or in combination of two or more.

For example, the ether-based solvent may comprise, but is not limited to, at least one selected from the group consisting of dimethyl ether, diethyl ether, dipropyl ether, methylethyl ether, methylpropyl ether, ethylpropyl ether, dimethoxyethane, diethoxyethane, methoxyethoxyethane, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, 1,3-dioxolane, polyethylene glycol dimethyl ether, polyethylene glycol diethyl ether, and polyethylene glycol methylethyl ether.

The ester-based solvent among the above organic solvents may be, but is not limited to, at least one selected from the group consisting of methyl acetate, ethyl acetate, propyl acetate, methyl propionate, ethyl propionate, propyl propionate, γ-butyrolactone, γ-valerolactone, γ-caprolactone, o-valerolactone, and s-caprolactone.

Specific examples of the linear carbonate-based solvent may comprise, but is not limited to, at least one selected from the group consisting of dimethyl carbonate (DMC), diethyl carbonate (DEC), dipropyl carbonate, ethylmethyl carbonate (EMC), methylpropyl carbonate, and ethylpropyl carbonate.

In addition, specific examples of the cyclic carbonate-based solvent may comprise, but are not limited to, at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and halides thereof. Examples of such halides may be, but are not limited to, fluoroethylene carbonate (FEC) and the like.

In addition, the electrolyte solution for the lithium-sulfur battery of the present invention may further comprise an additive commonly used in the related art in addition to the above-mentioned components. Examples thereof may be lithium nitrate ($LiNO_3$), potassium nitrate ($KNO_3$), cesium nitrate ($CsNO_3$), magnesium nitrate ($MgNO_3$), barium nitrate ($BaNO_3$), lithium nitrite ($LiNO_2$), potassium nitrite ($KNO_2$), cesium nitrite ($CsNO_2$) and the like.

The electrolyte solution for the lithium-sulfur battery of the present invention is an electrolyte solution for the lithium-sulfur battery which has the negative electrode of the lithium-based metal.

The lithium-based metal may be lithium or lithium alloy. In that case, the lithium alloy contains an element capable of alloying with lithium, and specifically the lithium alloy may be an alloy of lithium and at least one selected from the group consisting of Si, Sn, C, Pt, 0, Ni, Cu, Ti, Na, K, Rb, Cs, Fr, Be, Mg, Ca, Sr, Sb, Pb, In, Zn, Ba, Ra, Ge, and Al.

Lithium-Sulfur Battery

The present invention relates to a lithium-sulfur battery comprising a positive electrode; a negative electrode; a separator interposed between the positive electrode and the negative electrode; and an electrolyte solution, wherein the negative electrode is a lithium-based metal, and the electrolyte solution is the electrolyte solution of the present invention described above.

The electrolyte solution for the lithium-sulfur battery of the present invention is the electrolyte solution for the lithium-sulfur battery of the present invention described above.

The polymer protective film can be formed on the surface of the lithium-based metal by the ring-opening polymerization reaction of the heterocyclic compound contained in the electrolyte solution described above in the initial discharging stage of the battery.

Due to the formed polymer protective film, it is possible to inhibit the generation of lithium dendrites on the surface of the lithium-based metal which is a negative electrode, and to prevent decomposition of the electrolyte solution, thereby improving lifetime characteristics of the lithium-sulfur battery.

The positive electrode may comprise a positive electrode current collector and a positive electrode active material layer coated on one or both surfaces of the positive electrode current collector.

The positive electrode current collector is not particularly limited as long as it carries the positive electrode active material and has high electrical conductivity without causing chemical changes in the relevant battery. For example, copper, stainless steel, aluminum, nickel, titanium, palladium, sintered carbon; copper or stainless steel surface-treated with carbon, nickel, silver or the like; aluminum-cadmium alloy or the like may be used as the current collector.

The positive electrode current collector can enhance the bonding force with the positive electrode active material by having fine irregularities formed on its surface, and may be formed in various forms such as film, sheet, foil, mesh, net, porous body, foam, or nonwoven fabric.

The positive electrode active material layer may comprise a positive electrode active material, a binder, and an electrically conductive material.

The positive electrode active material may be at least one selected from the group consisting of elemental sulfur (Ss), an organic sulfur compound, $Li_2Sn$ (n≥1), and a carbon-sulfur polymer (($C_2Sx$) n: x=2.5~50, n≥2). Preferably, inorganic sulfur (Ss) can be used.

The electrically conductive material is for improving electrical conductivity, and is not particularly limited as long as it is an electronic conductive material that does not cause chemical changes in the lithium-sulfur battery.

The electrically conductive material may generally be carbon black, graphite, carbon fiber, carbon nanotube, metal powder, electrically conductive metal oxide, an organic conductive material, etc, Products that are currently marketed as conductive material may comprise acetylene black series (products from Chevron Chemical Company or Gulf Oil Company), Ketjen Black EC series (products from Armak Company), Vulcan XC-72 (a product from Cabot Company), and Super P (a product from MMM). For example, acetylene black, carbon black, graphite and the like can be used.

In addition, the positive electrode active material may further comprise a binder having a function of holding the positive electrode active material on the positive electrode current collector and connecting between active materials. As the binder, for example, various types of binders such as polyvinylidene fluoride-hexafluoropropylene (PVDF-co-HFP), polyvinylidene fluoride (PVDF), polyacrylonitrile, polymethyl methacrylate, styrene-butadiene rubber (SBR), carboxyl methyl cellulose (CMC) and the like can be used.

The positive electrode as described above can be prepared by a conventional method. Specifically, the positive electrode can be prepared by applying a composition for forming the positive electrode active material layer to the current collector, drying it, and optionally compressing and molding it into a current collector to improve electrode density, wherein the composition is prepared in the form of slurry by mixing the positive electrode active material, the electrically conductive material and the binder in an organic solvent. In that case, as the organic solvent, it is preferable to use a solvent which can uniformly disperse the positive electrode active material, the binder and the electrically conductive material, and which is easily evaporated. Specifically, acetonitrile, methanol, ethanol, tetrahydrofuran, water, isopropyl alcohol, and the like can be used as the organic solvent.

The positive electrode composition for forming the positive electrode active material layer can be coated on a positive electrode current collector using conventional methods known in the art, and for example, various methods such as dipping method, spraying method, roll court method, gravure printing method, bar court method, die coating method, comma coating method, or a combination thereof can be used.

After such a coating process, evaporation of the solvent and dispersion medium, densification of the coating film and adhesion between the coating film and the current collector take place in the positive electrode active material layer through drying process. At this time, the drying is carried out according to a conventional method and is not particularly limited.

The negative electrode is a lithium-based metal, and may further comprise a current collector on one side of the lithium-based metal. The current collector may be a negative electrode current collector.

The negative electrode current collector is not particularly limited as long as it has high electrical conductivity without causing chemical changes in the battery, and may be selected from the group consisting of copper, aluminum, stainless steel, zinc, titanium, silver, palladium, nickel, iron, chromium, and alloys and combinations thereof. The stainless steel can be surface-treated with carbon, nickel, titanium, or silver, and the alloy may be an aluminum-cadmium alloy. In addition to those, a nonconductive polymer, the surface of which is treated with sintered carbon, i.e. a conductive material, or a conductive polymer, etc. may be used. In general, thin copper foil is used as the negative electrode current collector.

In addition, the shape of the negative electrode current collector can be various forms such as a film having or not having fine irregularities on a surface, sheet, foil, net, porous body, foam, nonwoven fabric and the like.

In addition, the negative electrode current collector is in the thickness range of 3 to 500 μm. If the thickness of the negative electrode current collector is less than 3 Um, the current collecting effect is lowered. On the other hand, if the thickness exceeds 500 μm, when folding and then assembling the cell, there is a problem that the workability is reduced.

The lithium-based metal may be lithium or lithium alloy. In that case, the lithium alloy is an element capable of alloying with lithium, and specifically the lithium alloy may be an alloy of lithium and at least one selected from the group consisting of Si, Sn, C, Pt, Ir, Ni, Cu, Ti, Na, K, Rb, Cs, Fr, Be, Mg, Ca, Sr, Sb, Pb, In, Zn, Ba, Ra, Ge, and Al.

The lithium-based metal may be in the form of sheet or foil. In some cases, the lithium-based metal may have a form in which lithium or lithium alloy is deposited or coated by a dry process on the current collector, or a form in which metal and alloy of a particle phase are deposited or coated by a wet process or the like.

A conventional separator can be interposed between the positive electrode and the negative electrode. The separator is a physical separator having a function of physically separating electrodes. Any separator can be used without any particular limitations as long as it is used as a conventional separator, Particularly, a separator having an excellent humidification ability for electrolyte solution while exhibiting a low resistance to the migration of ions in the electrolyte solution is preferable.

In addition, the separator enables the lithium ion to be transported between the positive electrode and the negative electrode while separating or insulating the positive electrode and the negative electrode from each other. Such separator may be made of a porous, nonconductive or insulating material. The separator may be an independent member such as a film, or a coating layer added to the positive electrode and/or the negative electrode.

Examples of the polyolefin-based porous membrane which can be used as the separator may be a membrane formed of polyolefin-based polymer such as polyethylene such as high-density polyethylene, linear low-density polyethylene, low density polyethylene and ultra-high molecular weight polyethylene, polypropylene, polybutylene, and polypentene alone or a mixture thereof.

The nonwoven fabric which can be used as the separator may be, for example, a nonwoven fabric formed by each of, for example, polyphenylene oxide, polyimide, polyamide, polycarbonate, polyethylene terephthalate, polyethylene naphthalate, polybutylene terephthalate, polyphenylene sulfide, polyacetal, polyether sulfone, polyetheretherketone, polyester, etc., or a mixture of these polymers, and these nonwoven fabric comprises a spunbond or meltblown form consisting of long fibers which is in the form of fibers forming a porous web.

The thickness of the separator is not particularly limited, but is preferably in the range of 1 to 100 μm, more preferably in the range of 5 to 50 μm. If the thickness of the separator is less than 1 μm, the mechanical properties cannot be maintained, and if the thickness of the separator exceeds 100 μm, the separator acts as a resistance layer, thereby deteriorating the performance of the battery.

The pore size and porosity of the separator are not particularly limited, but it is preferable that the pore size is 0.1 to 50 μm and the porosity is 10 to 95%. If the pore size of the separator is less than 0.1 μm or the porosity is less than 108, the separator acts as a resistive layer. If the pore size of the separator exceeds 50 μm or the porosity exceeds 95%, the mechanical properties cannot be maintained.

In the case of the lithium-sulfur battery according to the present invention, it is possible to perform laminating or stacking and folding processes of the separator and the electrode, in addition to the winding process which is a general process. In addition, the case of the battery may be cylindrical type, square type, pouch type, coin type, or the like.

Hereinafter, preferred examples are provided to help the understanding of the present invention, but the following examples are merely for exemplifying the present invention, and it will be apparent to those skilled in the art that various changes and modifications can be made within the scope and spirit of the present invention, and such changes and modifications are within the scope of the appended claims.

<Manufacture of Lithium-Sulfur Battery>

Examples 1 to 9 and Comparative Examples 1 to 2

Sulfur was mixed with an electrically conductive material and a binder in acetonitrile using a ball mill to prepare a slurry of the positive electrode active material. In this case, carbon black was used as the conductive material and polyethylene oxide (molecular weight of 5,000,000 g/mol) was used as the binder, and the mixing ratio was set to be 90:5:5 by weight ratio of sulfur: conductive material; binder. The slurry of the positive electrode active material was applied to an aluminum current collector and dried to prepare a positive electrode.

A lithium metal thin film having a thickness of 35 μm was used as a negative electrode.

For electrolyte solution, dimethoxy ethane and dioxolane (DME: DOL=1:1 (volume ratio)) were used as organic solvent, 1M LiTFSI and 1 wt. % LiNO were dissolved in the organic solvent, and an additive was mixed therein to prepare an electrolyte solution for a lithium-sulfur battery.

The prepared positive electrode and the negative electrode were positioned to face each other, and the polyethylene separator was placed therebetween, and then the electrolyte solution was injected to manufacture lithium-sulfur batteries of Examples 1 to 9 and Comparative Examples 1 to 2 of the coin type.

The electrolyte solution of the lithium-sulfur battery prepared above is different in the type of the additive and the volume part of the additive with respect to 100 parts by volume of the organic solvent, which is shown in Table 1 below,

TABLE 1

|  | Type of additive | Content of additive relative to total weight of electrolyte solution | Parts by volume of additive relative to 100 parts by volume of organic solvent (organic solvent: additive) |
| --- | --- | --- | --- |
| Example 1 | 2-methylfuran | 3 wt. % | 3 parts by volume (97:3) |
| Example 2 | 2-methylthiophene | 3 wt. % | 3 parts by volume (97:3) |
| Example 3 | 2, 5-dimethylfuran | 3 wt. % | 3 parts by volume (97:3) |
| Example 4 | 2,5-dimethylthiophene | 3 wt. % | 3 parts by volume (97:3) |
| Example 5 | 2-methylfuran | 15.5 wt. % | 25 parts by volume (8:2) |
| Example 6 | 2-methylfuran | 23.1 wt. % | 42.86 parts by volume (7:3) |
| Example 7 | 2-methylthiophene | 24.8 wt. % | 42.86 parts by volume (7:3) |
| Example 8 | 2-methylfuran | 7.8 wt. % | 11.11 parts by volume (9:1) |
| Example 9 | 2-methylfuran | 38.3 wt. % | 100 parts by volume (5:5) |
| Comparative Example 1 | — | — | — |
| Comparative Example 2 | 2-methylpyrrole | 3 wt. % | 3 parts by volume (97:3) |

Experimental Example 1. Measurement of Lifetime Characteristics of Lithium-Sulfur Battery The lifetime characteristics of the lithium-sulfur batteries prepared in Examples 1 to 9 and Comparative Examples 1 to 2 were measured while repeating charging and discharging under the following conditions, and the results are shown in Table 2, and FIGS. 1 and 2.

Charging: rate 0.3 C, voltage 2.5V, CC
Discharging: rate 0.5 C, voltage 1.8V, CC

TABLE 2

| | Number of cycles to reach 80% retention |
|---|---|
| Example 1 | 115 |
| Example 2 | 98 |
| Example 3 | 69 |
| Example 4 | 70 |
| Example 5 | 175 |
| Example 6 | 172 |
| Example 7 | 143 |
| Example 8 | 125 |
| Example 9 | 59 |
| Comparative Example 1 | 47 |
| Comparative Example 2 | 22 |

In Table 2 and the results of FIG. 1, lithium-sulfur batteries using the electrolyte solutions of Examples 1 to 4 showed high capacity retention even after repeated cycles, and thus showed very excellent lifetime characteristics, as compared to lithium-sulfur batteries using electrolyte solutions of Comparative Example 1 without the additive and Comparative Example 2 containing nitrogen as a heteroatom.

That is, it can be seen that Comparative Example 1 does not contain the heterocyclic compound of the present invention and thus does not form a polymer protective film on a lithium-based metal which is a negative electrode, thereby showing poor lifetime characteristics. In addition, Comparative Example 2 showed that as nitrogen contained as a heteroatom, the ion conductivity of the electrolyte solution was decreased and the resistance of the surface of the lithium negative electrode was increased, thereby resulting in a decrease in the lifetime characteristics of the battery.

From the results of Table 2 and FIG. 2, it was shown that the lithium-sulfur batteries using the electrolyte solutions for the lithium-sulfur battery of Examples 5 to 7 showed high capacity retention rates and showed the best lifetime characteristics as compared to Examples 1 to 4 and Examples 8 and 9.

That is, it can be seen that if the additive is included in an amount of 25 to less than 100 parts by volume relative to 100 parts by volume of the organic solvent of the electrolyte solution for a lithium-sulfur battery, the leaching amount of polysulfide can be reduced, thereby suppressing the increase in resistance of the electrolyte solution, and from this, it is possible to further improve the lifetime characteristics of the lithium-sulfur battery.

In Example 8, as the additive was contained in an amount of 11.11 parts by volume with respect to 100 parts by volume of the organic solvent, the results were somewhat worse than those in Examples 5 to 7. In addition, in Example 9, since the additive was contained in an amount of 100 parts by volume relative to 100 parts by volume of the organic solvent, the cycle was longer than those of Comparative Examples 1 and 2, but the results were worse than Examples 1 to 8.

Therefore, it can be seen that the electrolyte solution for the lithium-sulfur battery of the present invention can improve the lifetime characteristics of the lithium-sulfur battery by forming the polymer protective film on the lithium-based metal which is a negative electrode, and thus suppressing the formation of lithium dendrites and reducing the decomposition and side reactions of the electrolyte solution on the surface of the lithium-based metal. In addition, it can be seen that if the additive is contained in an amount of 25 to less than 100 parts by volume relative to 100 parts by volume of the organic solvent in the electrolyte solution for the lithium-sulfur battery, it is possible to manufacture a lithium-sulfur battery with better lifetime characteristics.

The invention claimed is:

1. A method for inhibiting the generation of lithium dendrites in a lithium-sulfur battery, comprising:
   providing a lithium-sulfur battery comprising a positive electrode; a negative electrode; a separator interposed between the positive electrode and the negative electrode; and an electrolyte solution; and
   operating the lithium-sulfur battery,
   wherein:
   the negative electrode comprises a lithium-based metal, and
   the electrolyte solution comprises a lithium salt, a first organic solvent, and a second organic solvent,
   wherein the second organic solvent comprises a heterocyclic compound containing at least one double bond, where the heterocyclic compound further comprises an oxygen atom or a sulfur atom; with the proviso that the heterocycle ring does not comprise a nitrogen atom,
   wherein the heterocyclic compound comprises at least one selected from the group consisting of pyran, 2-methylpyran, 3-methylpyran, 4-methylpyran, thiophene, 2-methylthiophene, 2-ethylthiophene, 2-propylthiophene, 2-butylthiophene, 2,3-dimethylthiophene, 2,4-dimethylthiophene, and 2,5-dimethylthiophene,
   wherein the method further comprises forming a protective film on a surface of the lithium-based metal by a ring-opening polymerization reaction of the heterocyclic compound contained in the electrolyte solution in an initial discharging stage of the lithium-sulfur battery; and
   wherein the heterocyclic compound is present in an amount of 23.1 to 38% by weight relative to the total weight of the electrolyte solution for the lithium-sulfur battery.

2. The method for inhibiting the generation of lithium dendrites in a lithium-sulfur battery according to claim 1, wherein the heterocyclic compound comprises 2-methylthiophene.

3. The method for inhibiting the generation of lithium dendrites in a lithium-sulfur battery according to claim 1, wherein the lithium salt comprises at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiCABO$_8$, LiAsF$_6$, LiSbF$_6$, LiAlCl$_4$, CH$_3$SO$_3$Li, CF$_3$SO$_3$Li, (CF$_3$SO$_2$)$_2$NLi, (C$_2$F$_5$SO$_2$)$_2$NLi, (SO$_2$F)$_2$NLi, (CF$_3$SO$_2$)$_3$CLi, lithium chloroborane, lithium lower aliphatic carboxylate, lithium tetraphenyl borate and lithium imide.

4. The method for inhibiting the generation of lithium dendrites in a lithium-sulfur battery according to claim 1, wherein the lithium salt is contained at a concentration of 0.1 to 4 M.

\* \* \* \* \*